(No Model.) 2 Sheets—Sheet 1.

J. W. DUNHAM & F. P. & G. W. KISINGER.
DUMPING WAGON.

No. 340,494. Patented Apr. 20, 1886.

WITNESSES
Geo. F. Downing
S. G. Nottingham

INVENTORS
J. W. Dunham
F. P. Kisinger
G. W. Kisinger
By H. A. Seymour Attorney (No Model.)  2 Sheets—Sheet 2.
J. W. DUNHAM & F. P. & G. W. KISINGER.
DUMPING WAGON.
No. 340,494.  Patented Apr. 20, 1886.
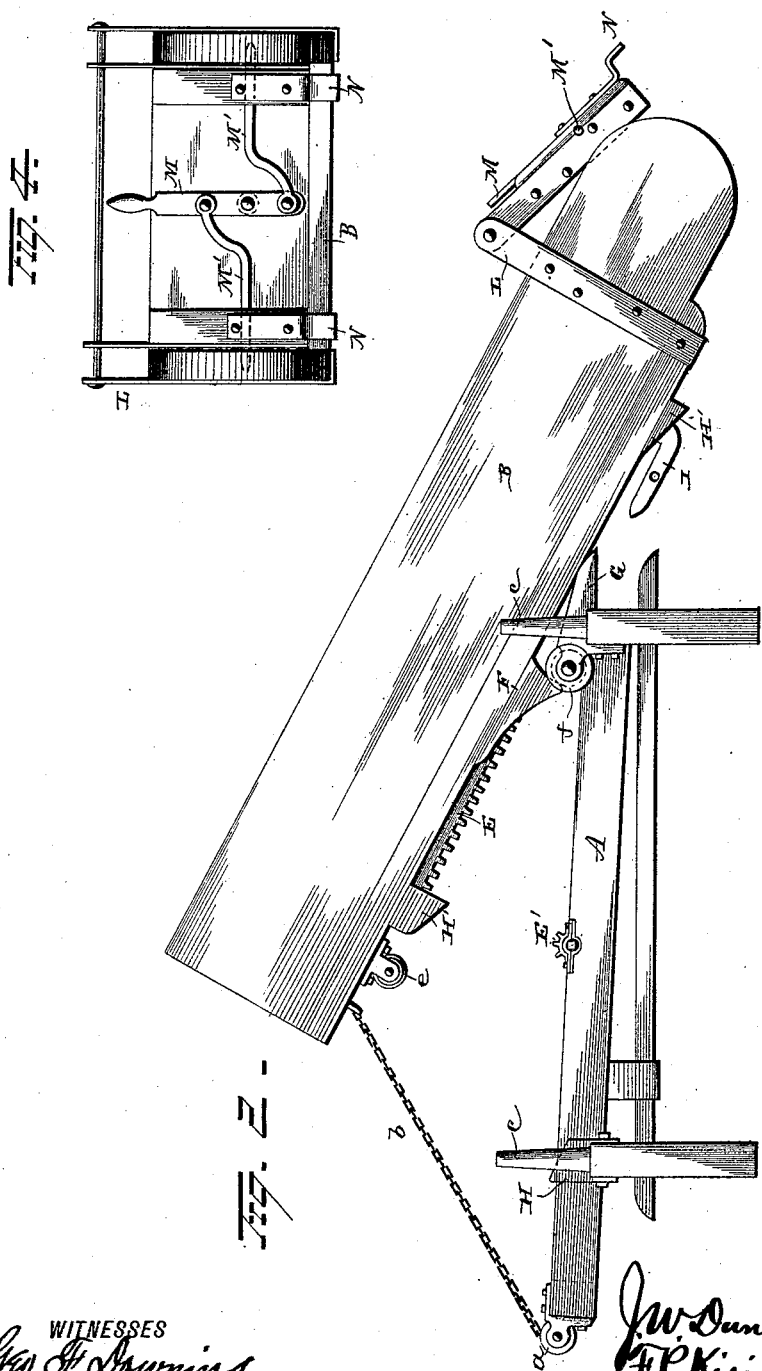

UNITED STATES PATENT OFFICE.

JOSEPH W. DUNHAM, OF ENGLEWOOD, AND FRANK P. KISINGER AND GEORGE W. KISINGER, OF DANVILLE, ILLINOIS.

DUMPING-WAGON.

SPECIFICATION forming part of Letters Patent No. 340,494, dated April 20, 1886.

Application filed August 5, 1885. Serial No. 173,624. (No model.)

*To all whom it may concern:*

Be it known that we, JOSEPH W. DUNHAM, FRANK P. KISINGER, and GEORGE W. KISINGER, of Englewood and Danville, in the counties of Cook and Vermilion, respectively, and State of Illinois, have invented certain new and useful Improvements in Dumping-Boxes for Wagons; and we do hereby declare the following to be a full, clear, and exact description of the invention, such as will enable others skilled in the art to which it appertains to make and use the same.

Our invention relates to an improvement in dumping-wagons, the object being to provide means whereby the wagon-body can be moved rearwardly, dumped, returned to a horizontal position, and drawn forward to its normal position by a single shaft.

A further object is to provide a device of this character that shall combine simplicity and economy in construction with durability and efficiency in use; and with these ends in view our invention consists in the parts and combinations of parts, as will be more fully described, and pointed out in the claims.

Figure 1:
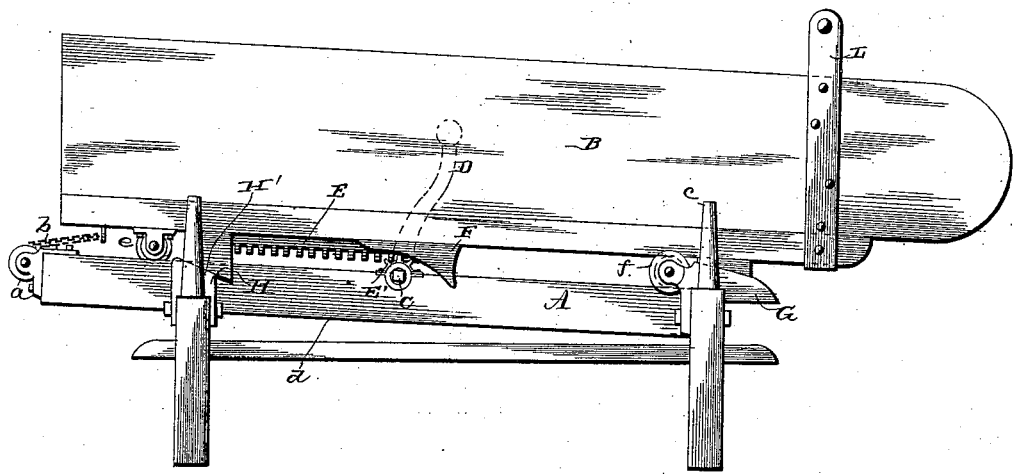
Figure 2:
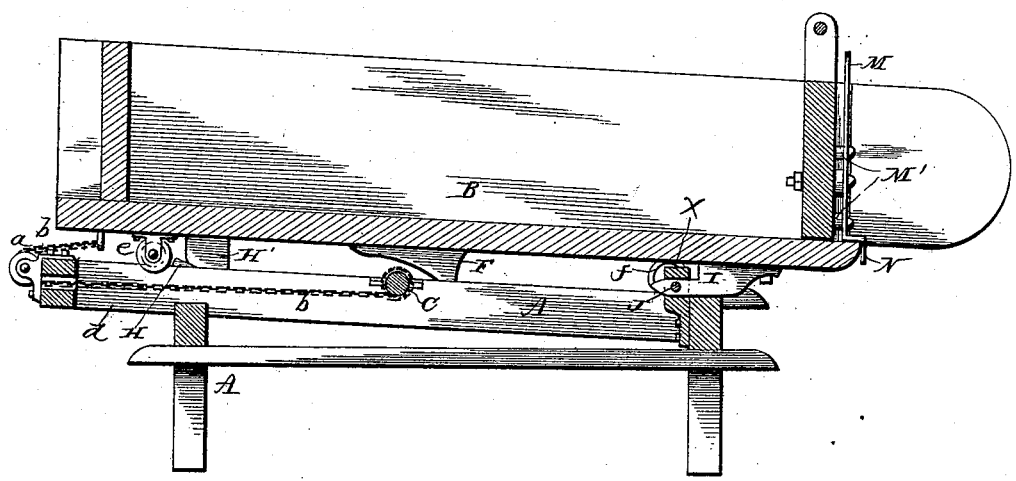

In the accompanying drawings, Figure 1 is a view in side elevation of a wagon embodying our invention. Fig. 2 is a similar view showing the wagon-body in position for dumping. Fig. 3 is a view in longitudinal vertical section of Fig. 1, and Fig. 4 is a view showing the end-gate.

A represents a wagon-bed mounted on wheels in the usual manner, and preferably with its front end slightly higher than its rear end, for the purpose of permitting the wagon-body B to slide rearwardly thereon, as will be hereinafter explained. To this bed is journaled the shaft C, which latter is located preferably midway the length of the bed, and provided with a crank, D, removable or not, as desired, by means of which the shaft is turned. To the front end of the wagon-bed is journaled the pulley $a$, around which passes the rope $b$, which connects the front end of the wagon-body to the shaft C. This wagon-body can be of any desired length, and rests between the upright guides $c$ of the bed A, and is provided on its lower face near its front end, at points over the longitudinal beams $d$ of the bed A, with rollers $e$, which latter are adapted to travel on said beams, and together with the rollers $f$, journaled in bearings secured to the wagon-bed and forming a rest for the rear end of the wagon-body, support said body and permit the same to move back and forth with the least possible resistance. The rollers $e$ are located a sufficient distance in front of the shaft C to permit the wagon-body to be moved to the limit of its back or rearward movement without coming into contact with the shaft. The wagon-body is also provided on its under surface with a rack-bar, E, adapted, when the body is in its normal or elevated position, to rest in contact with the pinion E', rigidly secured to the shaft C, and with the stops or abutments F, which latter are located in a line with the rollers $f$, and adapted to strike said rollers when the wagon-body is moved rearwardly sufficiently to cause it to tilt or dump. These stops are located near the opposite side edge of the wagon-body at or approximately at the center of gravity of said body, and the rear faces thereof are concaved or made hook shape, to enable them to take under the pulleys $f$ and prevent them from being drawn over the pulleys.

The wagon-bed A is provided at points immediately behind and in line with the rollers $f$ with the rearwardly-extending curved or beveled bearings G. These bearings are slightly lower than the rollers $f$, and hence the weight of the wagon-body and the load therein is not transferred from the rollers $f$ to the bearings G until the wagon-body has been tilted somewhat. The abutments are so located relative to the wagon-body that when they strike the rollers $f$ the weight of the portion of the body and load to the rear of the abutments is a trifle greater than the weight of the front portion of the body; hence when the abutments strike the rollers the wagon-body begins to tip. After the body has begun to tip, and before the rear end thereof strikes the ground, the under surface or floor of the body comes in contact with the rearwardly-projecting bearings G, and the weight is transferred from the rollers $f$ to the bearings G. This change in the pivotal point of the body renders the portions of the wagon-body in front of the pivotal point heavier than the portion to the rear of it, and prevents the wagon-body from going down with a rush.

H are four inclined bearings, located in pairs near the opposite ends of the wagon-bed, and adapted to register with four similarly-shaped bearings or blocks, H', secured to the under side of the wagon-body. When the wagon-body is nearing its normal position, after having been dumped and righted, the beveled faces of the blocks H' on the wagon-body come in contact with the oppositely-disposed faces of the blocks on the bed, and gradually elevate the wagon-body until the rollers at the front end thereof leave the bed and the rear end of the body leaves the rollers f. This transfers the weight from the rollers to the blocks, and forms a solid bearing for the wagon-body and prevents an unnecessary movement thereof. The wagon-body is also provided near its rear end with the forwardly-projecting tongue I, which latter is adapted to enter the slotted block X as the wagon-body is moved forwardly on the bed. This tongue is provided with a transverse opening registering with a similar opening in the slotted block for the reception of the locking-pin J, which locks the wagon-body to the bed. This pin is operated by a lever or any other suitable device.

To dump the wagon-body, the pin J is first withdrawn from the tongue I and the shaft turned to the right. The rack-bar on the wagon-body being in engagement with the pinion on the shaft, causes the wagon-body to move rearwardly or down the inclined surface of the bed until the abutments come in contact with the rollers f. As soon as the abutments strike the rollers the body begins to tip, as previously described. After the contents have been dumped the crank is turned in the opposite direction, which winds the rope or chain around the drum and causes the wagon-body to come to a horizontal position on the bed. As soon as the body falls or is drawn down on the bed the teeth of the rack-bar engage the pinion on the shaft and move the body up to its normal position, where it is locked by the pin, and preferably by a hook and staple or any equivalent device at or near the front end of the body.

In wagons of this character it is desirable to employ an end-gate that will permit of the escape of the material within the body without the necessity of detaching the gate. We accomplish this end by securing standards L to the outer surfaces of the sides of the body, and pivoting the gate to a rod secured to the upper ends of these standards. This gate is held in a locked position by the lever M, pivoted to the tail-gate, and provided with the bolts M', located, respectively, above and below the pivotal point of the lever. These bolts pass through side cleats in the tail-gate, and when the lever is moved in one direction are forced into sockets formed in the sides of the wagon, and are withdrawn therefrom by moving the lever in the opposite direction.

The gate is limited in its inward movement by the stops N, secured to the lower edge thereof and adapted to engage the bottom or floor of the body.

Just before the load is dumped the bolts are withdrawn and the end-gate moved upwardly until it clears the sides of the wagon, and is then moved longitudinally and lowered until one end thereof rests on one side of the body. After the gate is opened the body is dumped, as before set forth.

It is evident that many slight changes in the construction and arrangement of the several parts might be resorted to without departing from the spirit and scope of our invention. For example, instead of locking the body to the bed by means of the tongue I and slotted block x, as shown and described, an arrangement similar to that employed in locking the end-gate might be used, the lever M being secured to the bottom of the body in place of the tongue I, and the bolts M' being constructed to enter the sides of the block-bearings G; hence we do not wish to limit ourselves strictly to the construction herein set forth.

We are aware that it is not broadly new to employ a shaft and chains for moving the wagon-body rearwardly and forwardly, and also that it is not new to employ a rack-bar and pinion for moving the body rearwardly; but we are not aware that the rack-bar and pinion and the chain and shaft have ever been combined in a single device. In the devices wherein a chain is employed for moving the body back and forth the strain is all concentrated at the point of attachment of the chain to the body, whereas by the employment of a rack-bar and pinion the strain is distributed throughout the entire wagon-body. In the device wherein the rack and pinion are used no devices are employed for bringing the body into a horizontal position after the load has been dumped. By the employment of the rack-bar and chain we are enabled to dump the body, bring it into a horizontal position, and move it forward by the shaft and without touching the body.

Having fully described our invention, what we claim as new, and desire to secure by Letters Patent, is—

1. In a dumping-wagon, the combination, with a wagon-bed, a shaft journaled thereto, and a pinion secured to said shaft, of a sliding body, a rack-bar secured to said body and adapted to engage the pinion on the shaft, and a rope or other flexible device secured to the shaft and body and passing around a pulley journaled to the front portion of the bed, substantially as set forth.

2. In a dumping-wagon, the combination, with a wagon-bed, a shaft journaled thereto, a pinion secured to said shaft, and stops secured to the rear end of the wagon-bed, of a wagon-body, abutments secured thereto and adapted to engage the stops on the bed, a rack-bar secured to said body and adapted to engage the pinion, and a rope or chain connecting the shaft and body and passing around a pulley journaled to the bed.

3. The combination, with a wagon-bed having inclined bearings or blocks secured thereto, of a movable body having a series of inclined bearings or blocks adapted to rest on the bearings or blocks on the bed when the wagon-body is in its normal position.

4. The combination, with a movable bed mounted on rollers, of the inclined blocks secured to said bed and body and adapted to hold the body elevated and take the weight off the rollers when the body is in its normal position, substantially as set forth.

5. The combination, with a wagon bed, rollers journaled thereto near the rear end thereof, and bearings located behind the rollers, the upper or bearing surfaces of said bearings being below the upper surfaces of the rollers, of a wagon-body mounted on said rollers and provided with abutments adapted to come in contact with the rollers when the wagon-body is moved rearwardly, substantially as set forth.

6. The combination, with a wagon-bed, a sliding and tilting wagon-body mounted thereon, upwardly-projecting standards secured to the opposite sides of said body near the rear end thereof, and a bar connecting the upper ends of said standards, of a gate pivoted to said bar and adapted to be moved and swung longitudinally thereon, and devices, substantially as described, for locking the gate to the body.

In testimony whereof we have signed this specification in the presence of two subscribing witnesses.

J. W. DUNHAM.
FRANK P. KISINGER.

Witnesses:
J. B. LANYON,
S. G. WEBB.

In testimony whereof I have signed this specification in the presence of two subscribing witnesses.

GEORGE W. KISINGER.

Witnesses:
GEORGE F. DOWNING,
E. I. NOTTINGHAM.